Figure 1:
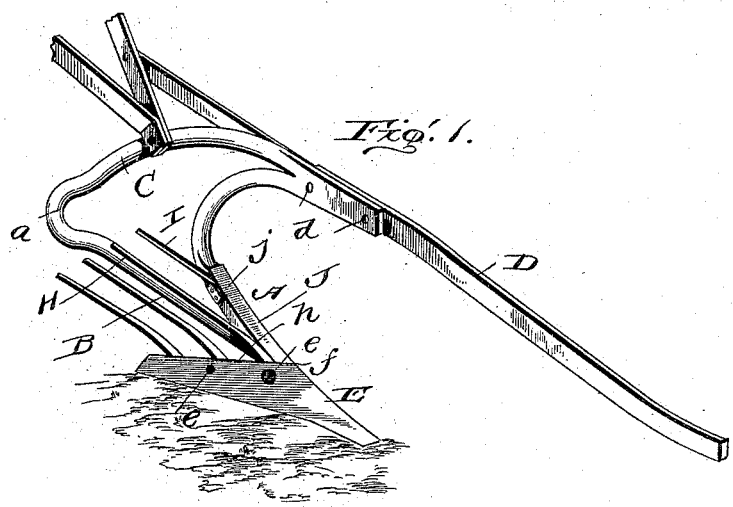

(No Model.)  2 Sheets—Sheet 1.

R. G. ROACH.
PLOW.

No. 488,287.  Patented Dec. 20, 1892.

Witnesses:

Inventor:
Richard G. Roach
By Edson Bro's
Atty's.

(No Model.) 2 Sheets—Sheet 2.
R. G. ROACH.
PLOW.
No. 488,287. Patented Dec. 20, 1892.
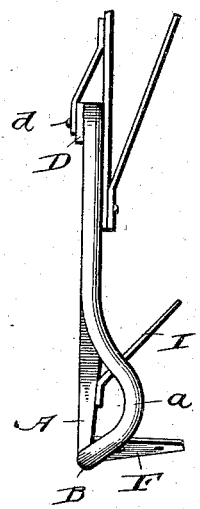
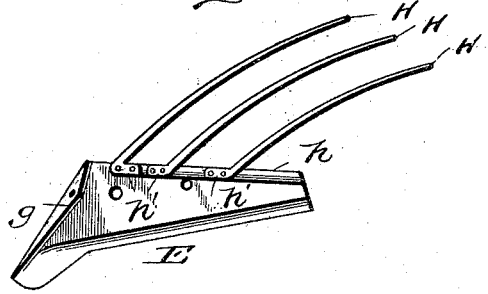
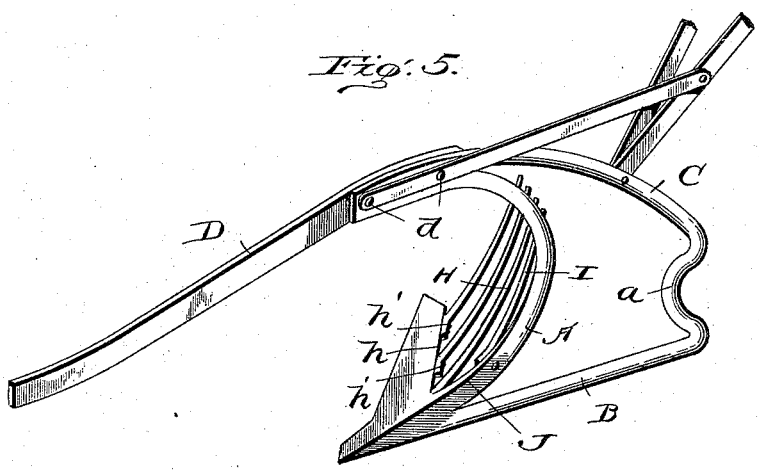
Witnesses:
Inventor:
Richard G. Roach
By Edson Bro's
Att'ys.

UNITED STATES PATENT OFFICE.

RICHARD G. ROACH, OF LEBANON, TEXAS.

PLOW.

SPECIFICATION forming part of Letters Patent No. 488,287, dated December 20, 1892.

Application filed July 25, 1892. Serial No. 441,120. (No model.)

*To all whom it may concern:*

Be it known that I, RICHARD G. ROACH, a citizen of the United States, residing at Lebanon, in the county of Collin and State of Texas, have invented certain new and useful Improvements in Plows; and I do hereby declare the following to be a full, clear, and exact description of the invention, such as will enable others skilled in the art to which it appertains to make and use the same.

The first part of my present invention relates to a peculiar form of moldboard of that class known in the art as "rod or finger" moldboards and comprising a series of elastic or yielding fingers which is shaped or curved to approximate the general upward and overhanging curvature of the well known style of moldboards.

The invention in this application, however, relates to the novel form of share adapted or designed for use in connection with such series of rods or fingers which is attached to the same in a manner to prevent the dirt or soil from lodging between and clogging up the series of the fingers at the points where they join the share. I also provide the stock or upright standard of the plow with a rod or finger curved to overhang one or more fingers of the series and which forms an obstruction to the passage or lodgment of the soil between the plow stock or foot and the inner finger of the series. This form of moldboard with a series of yielding fingers or rods is more especially adapted for pulverizing the sticky soil found in southern climates and for this purpose I have found the present improvement a very great advantage.

The second part of my invention consists in providing the front edge or face of the stock or foot of the plow with a vertical cutting edge which serves to sever the furrow slice cleanly and prevent breaking or pulverizing the slice from the furrow, thus causing the plow to run much easier and with less draft.

My invention further relates to the peculiar manner of constructing the landside, the foot or stock, and the rear brace between the stock or foot and the landside. These parts are formed of a single continuous piece of metal, as for instance a rod or bar, which is so bent as to throw the rear brace to one side of the vertical line of the landside and thus prevent the rear brace from coming in contact with the side of the furrow and from rubbing or holding any earth from the side of the furrow, the object being to present as little surface as possible to the soil which in the case of the sticky soil is very liable to adhere to and clog up the plow.

The invention further relates to the novel construction of the foot or stock and landside forming a frog for the attachment of the removable share to the plow, which share has the fingers or elastic rods secured to its rear edge. And finally the invention relates to the novel construction and arrangement of devices which will be hereinafter fully described and particularly pointed out in the claims.

The accompanying drawings fully illustrate the invention, in which:—

Figure 2:
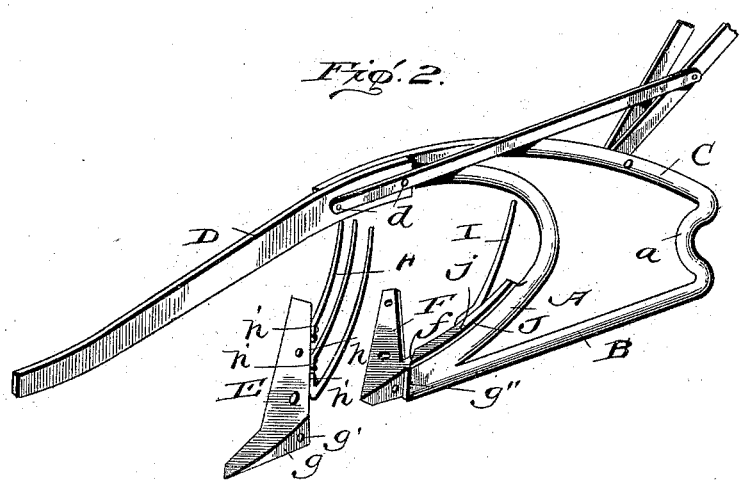

Figure 1 is a perspective view of the preferred embodiment of the plow having a slip share attached to the frog formed by the upright stock or foot and the landside. Fig. 2 is a perspective view of the plow stock, landside and frog with the share and moldboard detached. Fig. 3 is a plan view of the same parts to show the peculiar manner of forming the rod to produce the rear brace and the landside. Fig. 4 is a detached view of the slip share and the moldboard. Fig. 5 is a view of the plow in which the share is rigid with the foot or stock of the implement.

Like letters of reference denote like parts in all the figures of the drawings, referring to which—

A designates the upright foot or stock of the plow, B the landside and C is the brace between the stock and the landside. These parts are all formed of a single piece of metal for simplicity, strength and cheapness, and in the manufacture of the implement I take a bar or rod of metal, either round square or any other desired form in cross section, which rod or bar is bent to form the straight horizontal landside, then curved upwardly to form the stock or foot A, and then the other end of the bar or rod is curved or arched upward and forward from the rear end of the landside B as clearly shown by Fig. 2. The meeting ends of the bar or rod, at the upper end of the stock A and the forward end of the brace, are united or fastened together, as for instance by welding or in any other suitable way; and to said united ends is secured the rear end of the plow beam D which may be fastened detachably in place by means of the transverse bolts $d$ which are passed through aligned bolt holes in said parts, the beam lapping the united ends of the stock and brace.

To present as little surface of the plow to the earth on the landside of the furrow, and to strengthen the parts, I provide an offset or shoulder $a$ between the brace and the landside B, which offset is formed by bending the bar or rod at the juncture of the brace with the landside, and which serves to throw the lower rear part of the brace to the inside of the vertical line of the landside so that the brace will not be brought into contact with or drag against the soil or earth of the landside, whereby the plow can be drawn much easier and with less draft.

In the preferred embodiment of my invention I provide the plow with a slip share E and form the front connected ends of the landside and stock with a frog F adapted to receive the share which is secured to the same by means of the bolts $e$ that are passed through aligned bolt holes in the share and frog, as shown. The frog extends laterally from the meeting ends of the standard and landside, in the inclined position shown, and in the front of the stock, above the line of the frog is formed a shoulder $f$ against which the upper edge of the share bears or impinges when the share is properly fitted to the frog. The landside edge of the share being provided with a depending flange $g$ which fits against the outer side of the landside, and is secured thereto by means of the transverse bolt $g'$; the flange lying against the shoulder $g''$ on the landside so that the outside of the flange is flush with the lateral face of the landside.

H, I, designate the series of elastic fingers or rods forming the moldboard of the plow. The fingers H are attached rigidly to the upper edge of the share which is slanted or inclined at $h$; and the lower ends of said fingers are provided with the lugs $h'$ applied against said slanting edge of the share and bolted or riveted securely thereto. The finger I is likewise secured to the inner side of the curved stock or foot of the plow, and these fingers are curved upward and laterally to approximate the curvature or peculiar configuration of the well known style of moldboard to turn over the furrow slice.

To adapt the plow or implement to sever the furrow slice cleanly and evenly I provide the stock or foot with a cutting edge J which is arranged on the side or edge thereof adjacent to the landside. This cutting edge may be made separate from the stock or foot, in the form of a blade $j$ which is curved to conform to the shape of the stock A and is riveted, bolted or otherwise securely attached to the stock, as in Figs. 1 and 2; or the front face of the stock or foot may be beveled transversely to form the cutting edge J as in Fig. 5.

Although I prefer to provide the plow with the frog and the slip share; as in Figs. 1 to 4 inclusive, yet I do not strictly confine myself to this specific construction as the share may be rigidly or immovably attached to the united ends of the landside and stock as illustrated by Fig. 5.

In the use of my improved plow, the share and cutting edge J on the stock serve to cut the furrow slice evenly and cleanly, and the furrow slice as it passes up over the yielding rods or fingers is pulverized by the vibration of the rods which are unsupported or free to play at their free ends. By the peculiar method of attaching the rods or fingers to the share, the earth is prevented from lodging between the lower ends of the fingers and the upper edge of the share. The plow can be drawn with more ease and less draft than ordinary plows as the share and cutter J on the stock serve to cut the earth cleanly, and the brace by reason of its offset does not drag or contact with the earth on the landside.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fairly fall within the scope of the same.

Having thus fully described my invention, what I claim as new and desire to secure by Letters Patent, is:—

1. A plow, substantially as herein shown and described, having the landside, stock and brace bent from a single continuous bar of metal and provided with a lateral offset $a$ between the contiguous ends of the brace and landside, the free ends of the stock and brace being united together and adapted to have the beam secured thereto, as and for the purpose described.

2. A plow, substantially such as described, having the landside B, the stock A and the brace C between the landside and stock bent from a single continuous bar of metal, the meeting ends of said metallic bar being united together and affording convenient means for the attachment of the plow beam, as set forth.

3. In a plow, the stock and landside having the lateral frog F at their united ends, the vertical cutter J at the outer front edge of the stock, the shoulders $f$, $g''$, at the lower end of the cutter J and the united ends of the stock and landside, and the share E fitted against the frog to lie against the shoulder $f$ flush with the cutter, and provided with the lip $g$ that fits over the point and against the shoulder $g''$, substantially as described.

4. In a plow, the combination of the stock, the share seat rigid therewith the share having the inclined upper edge $h$, and the series of elastic rods or fingers H, I, the fingers H being fastened at their lower ends to the share and the inner finger I of the series secured directly to the stock, on the side adjacent to the share, substantially as described.

In testimony whereof I affix my signature in presence of two witnesses.

RICHARD G. ROACH.

Witnesses:
W. T. KENNEDY,
JOHN CROZIR.